US006631546B1

(12) United States Patent
Dinan et al.

(10) Patent No.: US 6,631,546 B1
(45) Date of Patent: Oct. 14, 2003

(54) SELF-ALIGNED VOID FILLING FOR MUSHROOMED PLATING

(75) Inventors: Thomas Edward Dinan, San Jose, CA (US); Richard Hsiao, San Jose, CA (US); John I. Kim, San Jose, CA (US); Ashok Lahiri, Mainz (DE); Clinton David Snyder, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/496,070

(22) Filed: Feb. 1, 2000

(51) Int. Cl.$^7$ .......................... G11R 5/127; G04R 31/00
(52) U.S. Cl. ..................... 29/603.07; 29/846; 29/847; 216/22; 216/67; 216/49; 427/96; 427/98
(58) Field of Search .................. 29/603.07, 603.13, 29/603.15, 603.18, 846, 847, 852; 360/126; 216/22, 67, 49; 427/98, 96

(56) References Cited

U.S. PATENT DOCUMENTS

| | | | | |
|---|---|---|---|---|
| 4,224,361 A | * | 9/1980 | Romankiw | 427/259 |
| 4,516,180 A | | 5/1985 | Narishige et al. | 360/126 |
| 4,875,124 A | | 10/1989 | Dickstein et al. | 360/126 |
| 4,933,209 A | * | 6/1990 | Anthony | 427/116 |
| 5,045,961 A | * | 9/1991 | Kobayash | 360/126 |
| 5,118,386 A | * | 6/1992 | Kataoka et al. | 156/656 |
| 5,282,308 A | | 2/1994 | Chen et al. | 29/603 |
| 5,646,804 A | | 7/1997 | Backer et al. | 360/113 |
| 5,870,262 A | | 2/1999 | Ikegawa et al. | 360/126 |
| 5,877,924 A | | 3/1999 | Saito | 360/126 |
| 5,901,431 A | * | 5/1999 | Santini | 29/603.14 |
| 5,926,349 A | * | 7/1999 | Krounbi | 360/113 |
| 5,966,800 A | * | 10/1999 | Huai | 29/603.18 |
| 6,043,959 A | * | 3/2000 | Crue | 360/113 |
| 6,181,514 B1 | * | 1/2001 | Santini | 360/126 |
| 6,209,192 B1 | * | 4/2001 | Urai | 29/603.14 |
| 6,337,783 B1 | * | 1/2002 | Santini | 360/317 |

* cited by examiner

Primary Examiner—A. Dexter Tugbang
Assistant Examiner—Alan M. Boswell
(74) Attorney, Agent, or Firm—Robert O. Guillot; IPLO Intellectual Property Law Offices

(57) ABSTRACT

A method of manufacturing includes 2 mushroom plating process starts with an overplated component which includes an enlarged mushroom head having outer portions which overhang a resist layer. The next step in the first process embodiment is a heating step in which the resist layer is hard baked. Thereafter, using a dry etch process, such as a reactive ion etch (RIE) process, the hard baked resist layer is removed in all areas except beneath the overhang of the mushroom head. The area beneath the overhang thereby remains filled with hard baked resist. Thereafter, the device is ultimately encapsulated such that no voids and/or redeposition problems exist under the overhang due to the presence of the hard baked resist. In an alternative process embodiment of the present invention the dry etch process is conducted first upon the resist layer, such that the resist layer is removed in all areas except under the overhang. Thereafter, the device is baked, such that hard baked resist remains beneath the overhang. Ultimately, the device is encapsulated and no voids or redeposition problems exist beneath the overhang due to the presence of the hard baked resist.

18 Claims, 6 Drawing Sheets

SELF-ALIGNED VOID FILLING FOR MUSHROOMED PLATING

BACKGROUND OF THE INVENTION

1. Field of the Invention

The present invention relates generally to electroplating processes utilized in the manufacture of thin film devices, and more particularly to mushroom plating process steps utilized in the manufacture of thin film devices such as magnetic read/write heads, as well as devices created using such process steps.

2. Description of the Prior Art

Electroplating process steps are utilized to create metallic structures and electrical interconnects in the manufacturing of many types of thin film devices. Such thin film devices include integrated circuit devices, and thin film magnetic read/write heads utilized in hard disk drives, microelectromechanical devices and the like.

As is well known, photolithographic techniques are utilized in the process steps that are utilized to create the electrochemically plated metallic structures, and a significant limitation on the use of photolithographic techniques can occur where the hole or trench that is created is both deep and narrow, that is, it has a high aspect ratio. In such situations it is difficult to accurately create the trench or hole, and it is likewise difficult to effectively electrochemically plate into the high aspect ratio trench. Prior art attempts to overcome these problems have utilized overplating techniques, also termed mushroom plating. These mushroom plating techniques may involve the utilization of a shallower trench than is required for the desired height of the metal component structure, followed by the overplating of the trench, such that a generally mushroom shaped cap is formed in the area on top of the trench. The relatively shallow trench facilitates good electrochemical plating at the base of the trench, and the mushroom plating facilitates the formation of the tall component structure that is desired. Likewise, in fabricating complex shaped metal structures, such as the yoke of the second magnetic pole of a thin film magnetic write head, some portions of the photoresist trench may be significantly deeper than other, shallower portions of the trench. In this situation, when the metallic plating is performed to a depth that fills the deeper portions of the trench, overplating occurs in the shallower trench areas. With specific regard to such write head magnetic poles, typically the pole tip area is formed with a deep trench, whereas the wider yoke area is formed with a shallower trench. In the plating process, the pole tip area is formed entirely within its deeper trench, whereas overplating occurs in the yoke area, leading to the formation of a mushroomed yoke.

In the prior art photolithographic plating techniques, following the plating step the photoresist is removed utilizing a wet etch chemical removal step. Significant problems are incurred at this point in the prior art mushroom plating processes. Specifically, where the photoresist is chemically removed, an empty space is created beneath the overhanging portions of the mushroom head. Thereafter, in following process steps, unwanted redeposition of reactive species and particulates can occur beneath the overhang, and it is difficult if not impossible to remove the redeposited material beneath the overhang. Additionally, when the device is finally encapsulated at the end of the manufacturing process, voids are created beneath the overhang which are detrimental to the performance of the manufactured devices. The process of the present invention eliminates the redeposition and void creation problems previously incurred in employing mushroom plating techniques.

SUMMARY OF THE INVENTION

A first embodiment of the mushroom plating process of the present invention starts with an overplated component which includes an enlarged mushroom head having outer portions which overhang a resist layer. The next step in the first process embodiment is a heating step in which the resist layer is hard baked. Thereafter, using a dry etch process, such as a reactive ion etch (RIE) process, the hard baked resist layer is removed in all areas except beneath the overhang of the mushroom head. The area beneath the overhang thereby remains filled with hard baked resist. Thereafter, the device is ultimately encapsulated such that no voids and/or redeposition problems exist under the overhang due to the presence of the hard baked resist. In an alternative process embodiment of the present invention the dry etch process is conducted first upon the resist layer, such that the resist layer is removed in all areas except under the overhang. Thereafter, the device is baked, such that hard baked resist remains beneath the overhang. Ultimately, the device is encapsulated and no voids or redeposition problems exist beneath the overhang due to the presence of the hard baked resist. Devices that are manufactured utilizing the processes of the present invention are also included within the invention. While not intended to be limiting in any manner, one such device is a thin film magnetic head wherein the yoke portion of a magnetic pole is formed utilizing the mushroom plating techniques of the present invention. Another mushroom plated component found in many devices is a mushroom plated electrical interconnecting stud that is formed utilizing the process steps of the present invention.

It is an advantage of the mushroom plating process of the present invention that mushroom plating can be conducted without incurring redeposition and void problems.

It is another advantage of the present invention that improved mushroom plated component can be obtained without significant additional manufacturing process steps.

It is a further advantage of the present invention that the space under the mushroom head overhang is filled, such that redeposition does not occur, and voids do not occur during encapsulation.

It is yet another advantage of the present invention that an improved mushroomed yoke structure is provided for thin film magnetic write heads.

It is yet a further advantage of the present invention that improved mushroom plated electrical interconnect studs are provided for thin film devices.

These and other features and advantages of the present invention will be well understood by those skilled in the art upon reading the following detailed description which makes reference to the several figures of the drawing.

IN THE DRAWINGS

Figure 15:
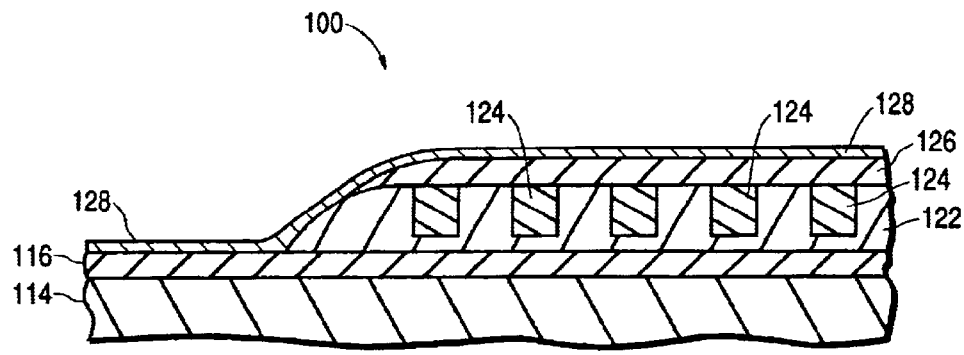
FIGS. 15–17 depict prior art mushroom plating process steps generally undertaken in the mushroom plating of the yoke portion of the second pole of a thin film magnetic write head.
Figure 16:
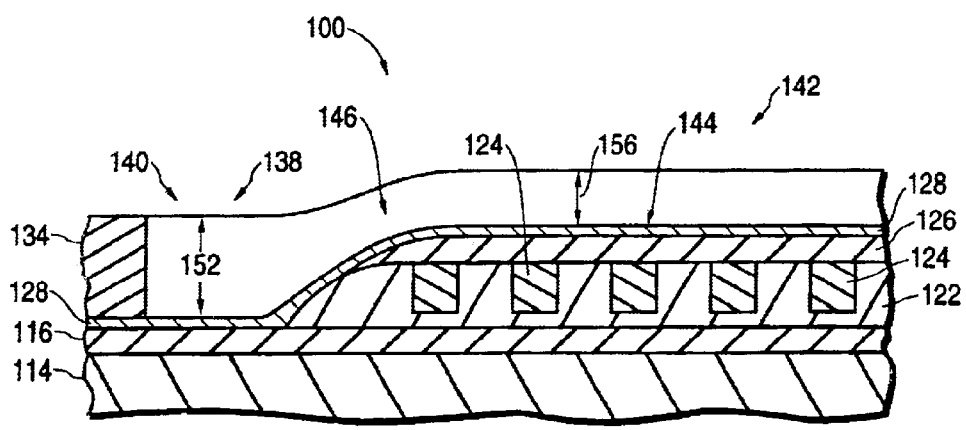
Figure 17:
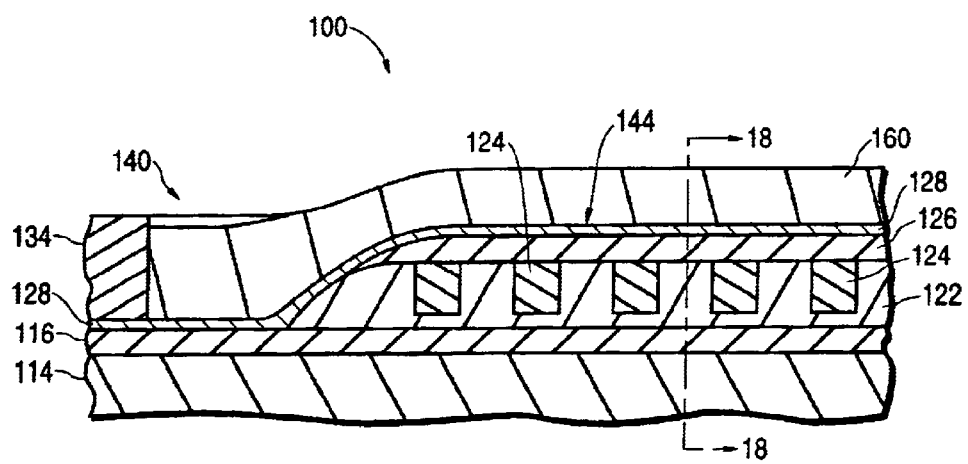
Figure 18:
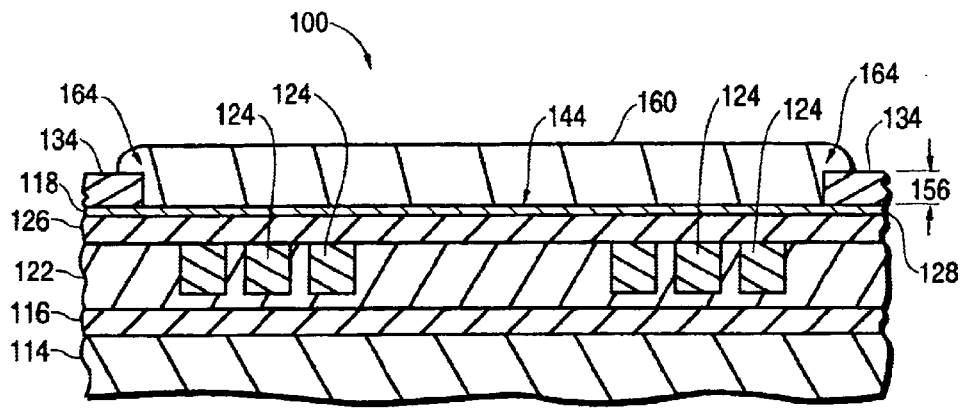
Figure 19:
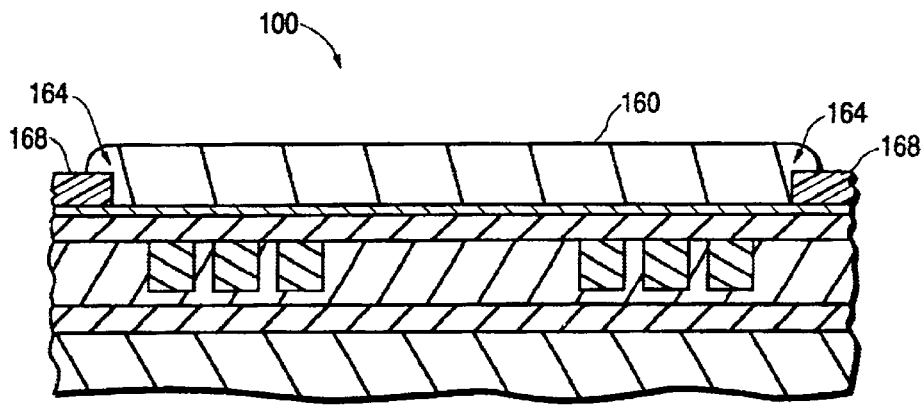
Figure 20:
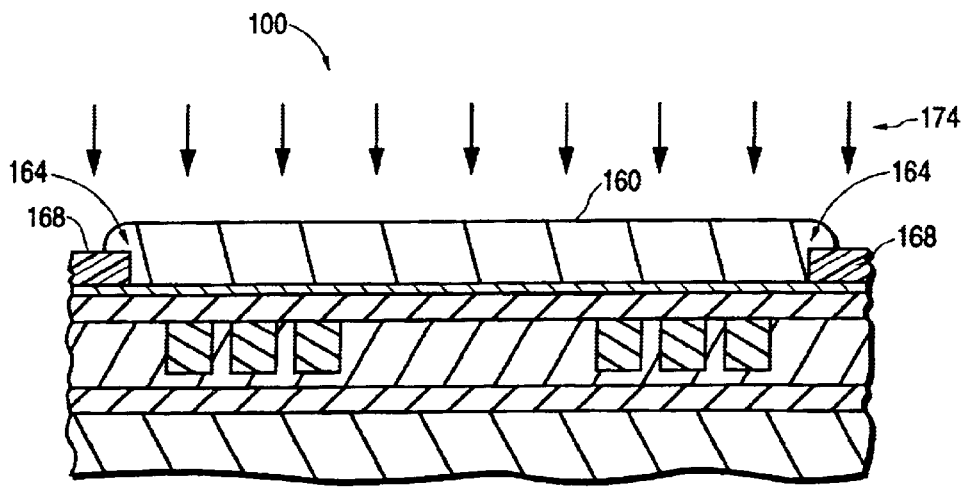
Figure 21:
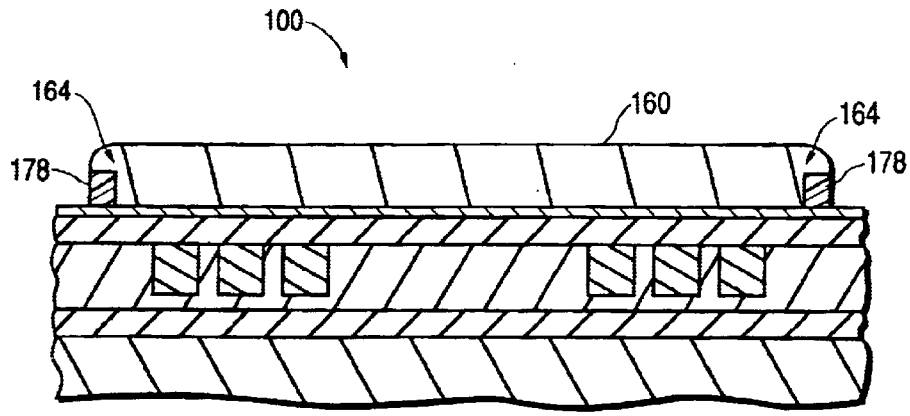
Figure 22:
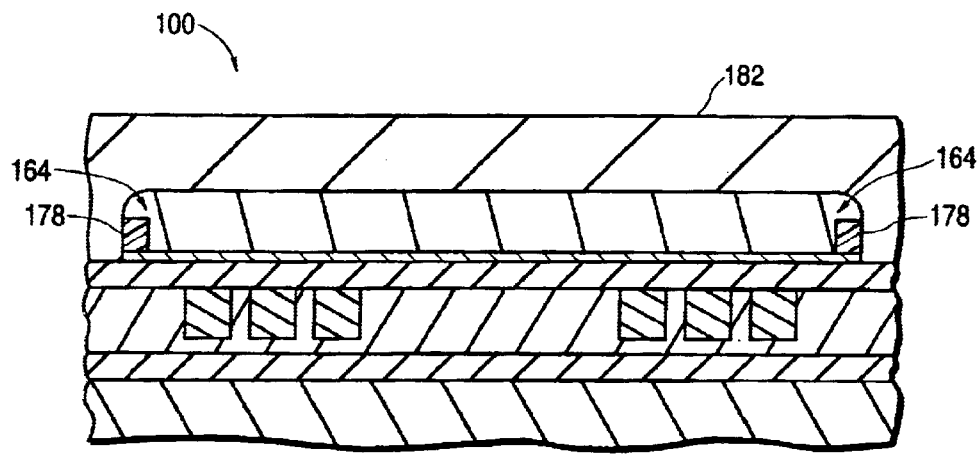
Figure 23:
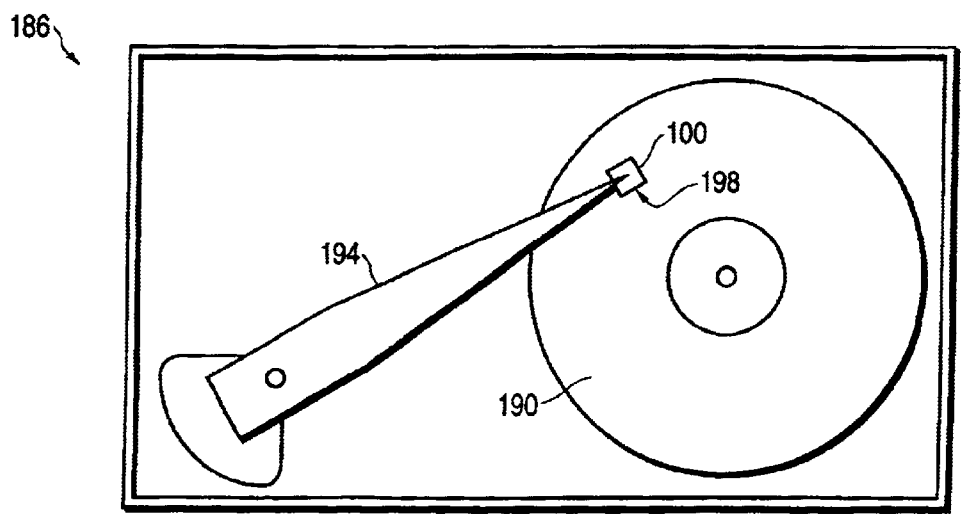

FIGS. 18–22 depict the mushroom plating process steps of the present invention as applied to the mushroom plated yoke depicted in FIGS. 15–17, wherein FIG. 18 is a cross-sectional view of the device depicted in FIG. 17, taken along lines 18—18 of FIG. 17; and FIG. 23 is a top plan view that generally depicts a hard disk drive including a magnetic head having a mushroom plated component of the present invention.

DETAILED DESCRIPTION OF THE PREFERRED EMBODIMENTS

Figure 1:
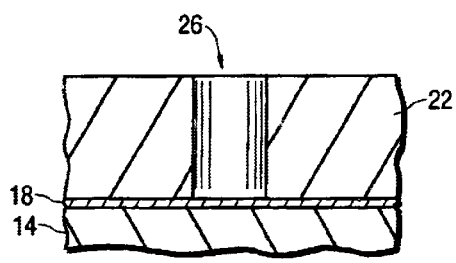
FIGS. 1–5 depict prior art process steps generally undertaken to accomplish mushroom plating during the manufacturing of thin film devices.

FIGS. 1–5 depict well known prior art mushroom plating technique process steps, and a brief description thereof will serve as a basis for understanding the present invention and its advantages. FIG. 1 will serve as a starting point in the prior art process steps; it depicts a first layer 14 upon which a plated component is to be formed. As is well known, a seed layer 18 is first deposited upon the layer 14 and a photo-lithographic resist layer 22 is thereafter deposited upon the seed layer 18. Utilizing photolithographic techniques a hole or trench 26 is formed through the resist layer 22 down to the seed layer 18. The basic starting process configuration depicted in FIG. 1 is found and utilized in many different device manufacturing processes wherever electrochemical plating of a metal layer is being performed. As described in detail herebelow, some particular instances in which the basic configuration depicted in FIG. 1 are utilized include the plating steps involved in the formation of the yoke portion of a thin film magnetic write head, as well as the plating of metal studs that serve to electrically interconnect the various components of thin film magnetic heads with control circuitry and the like.

Figure 2:
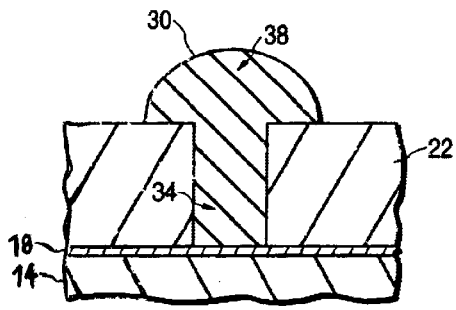
Figure 3:
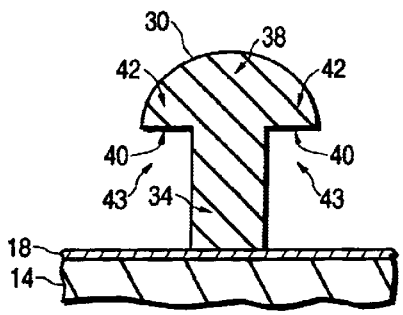

For various manufacturing reasons it is often desirable and/or necessary to overplate into the hole 26, and as depicted in FIG. 2, when overplating is performed, the plated metal component 30 forms a neck portion 34 within the hole 26 and an enlarged outer portion 38 that is typically termed a mushroom head due to its shape. The next step in standard prior art photolithography is the removal of the photoresist utilizing a wet chemical etch process as depicted in FIG. 3. After the wet etch process has been completed, the mushroomed plated metal component 30 remains, along with the seed layer 18. The component 30 is now configured to include an exposed undersurface 40 disposed beneath an overhanging portion 42 of the mushroom head 38, such that an open area 43 exists under the overhanging portion 42.

Figure 4:
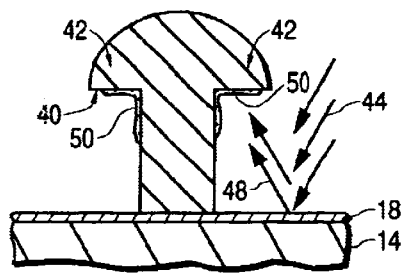

Thereafter, the seed layer 18 is commonly removed in a broad beam ion etching process or similar dry etching process, in which the ion beam 44 etches away the seed layer material 48, as depicted in FIG. 4. Sometimes etching needs to proceed further to remove the material under the seed layer, to produce a notched P1 pole tip. A first significant prior art problem occurs at this point in that the removed material 48 can become re-deposited 50 upon the undersurface 40 of the overhanging portion 42.

Figure 5:
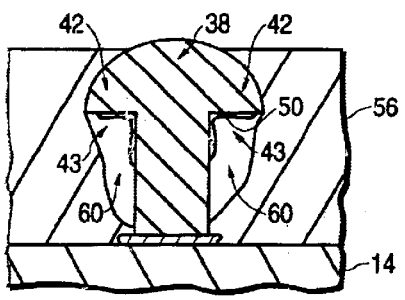

A second problem with the prior art mushroom plating process occurs during the prior art encapsulation step, as is depicted in FIG. 5. Specifically, at some point during the prior art manufacturing process the device components are ultimately encapsulated, typically using a dieletric such as alumina, in a sputtering or other dry deposition process. When the encapsulation layer 56 is thus deposited, owing to the anisotropic, straight, line of sight directional nature of the dry deposition process, a void 60 can be formed in the area 43 beneath the overhanging portion 42 of the mushroom head 38. Such voids 60 have been shown to be detrimental to the performance of devices manufactured using these prior art manufacturing techniques. The present invention therefore provides improved manufacturing steps that eliminate the redeposition problem as well as the void problem, while retaining the option for process engineers to utilize mushroom plating process techniques where they are necessary or desired.

Figure 6:
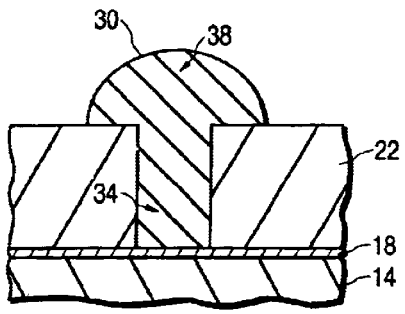
FIGS. 6–10 depict process steps of a first embodiment of the present invention undertaken to perform mushroom plating during the manufacturing of thin film devices.
Figure 7:
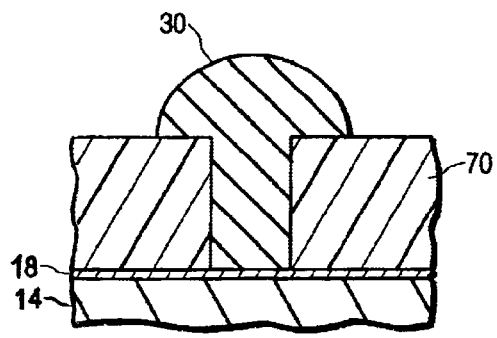

FIGS. 6–10 depict a series of process steps which comprise a first method of the present invention for improved mushroom plating. Initially, FIG. 6 serves as the starting point of the first method of the present invention; FIG. 6 is identical to FIG. 2 and is provided for the purpose of clarity of explanation. Therefore, as depicted in FIG. 6, a metal component 30 has been mushroom plated into a hole in a resist layer 22 utilizing well known photolithographic and metal plating techniques. Thereafter, as depicted in FIG. 7, prior to the removal of the photoresist layer 22, the device is hard baked to create a hardened photoresist layer 70. Significantly, in some devices the metal component 30 must be annealed, such as is required in the manufacturing of thin film magnetic heads, where the component 30 is a magnetic pole and the annealing step is performed to enhance its electromagnetic flux flow control properties. In that instance, the annealing step, which must be performed during the manufacturing process, is advantageously performed while the photoresist layer 22 is present, and it results in the hard baked photoresist layer 70. A typical annealing step utilizes temperatures of approximately 200 to 250° C. for approximately 1 to 5 hours, which is comparable to the resist bake process parameters. Thus, the resist hard baking step does not necessarily result in an additional manufacturing step.

Figure 9:
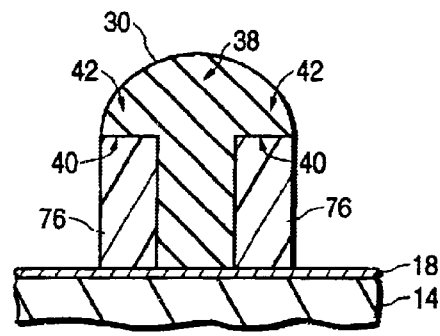
Figure 8:
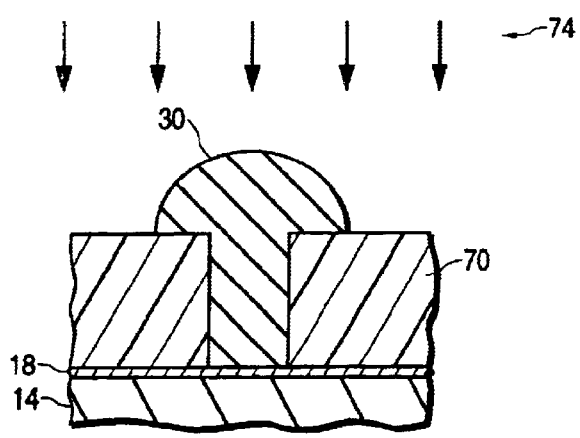
Figure 10:
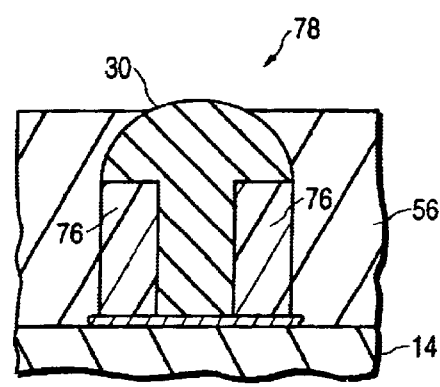

Thereafter, as depicted in FIG. 8, in a further departure from the prior art process steps, the hard baked photoresist layer 70 is removed utilizing a dry etch process such as a reactive etch process, preferably an RIE process utilizing oxygen to create reactive species 74, and the resulting device is depicted in FIG. 9. Of course, other dry etch processes such as reactive ion beam etching (RIBE) and/or chemically assisted ion beam etching (CAIBE) can be utilized to remove the resist layer 70, and references herebelow to an RIE process should be taken to include these and other dry etch processes that are suitable to remove the resist layer 70 as is described herein. As depicted in FIG. 9, owing to the straight, line of sight directional nature of the RIE process, portions 76 of the hard baked photoresist remain beneath the undersurface 40 of the overhanging portion 42 of the mushroom head 38. Additionally, the seed layer acts as a natural stop on the RIE etching with oxygen, because the oxygen reacts more strongly with the resist than the metallic seed layer. Thus, relatively low RIE oxygen etchant energies of approximately 50 to 100 eV can be used to effectively remove the resist. Significantly, in contrast to the prior art device depicted in FIG. 3, and described hereinabove, following the RIE etch step there are no open areas 43 under the mushroom overhang 42. Thereafter, the prior art process steps depicted in FIGS. 4 and 5 involving the removal of the seed layer 18 and the formation of an encapsulation layer 56 of the component are completed. The process of the present invention thus results in a mushroom component 78 such as is depicted in FIG. 10. Specifically, as is seen in FIG. 10, the remaining portion of the hard baked photoresist 76 fully fill the area 43 under the mushroom head 38 beneath the overhang 42. There is no redeposition problem because the open area 43 beneath the overhang 42 formed in the prior art process is non-existent, and voids 60 (see FIG. 5) which were a problem in the prior art process are also eliminated. The hard baked resist 76 is a good electrical insulator, and its presence presents no problems in the device 78. Thus the present invention constitutes an improved process for manufacturing mushroom plated components that can be utilized to manufacture many and various types of devices.

Figure 11:
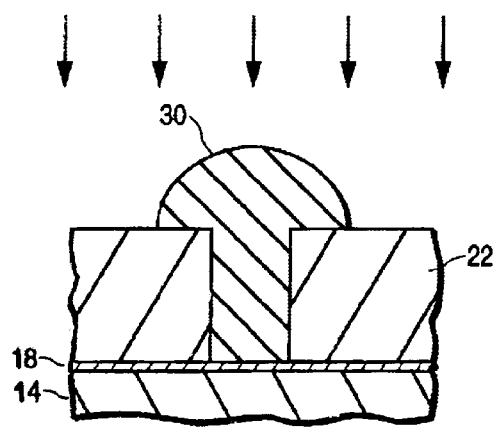
FIGS. 11–14 depict process steps of an alternative embodiment of the present invention undertaken to perform mushroom plating during the manufacturing of thin film devices.
Figure 13:
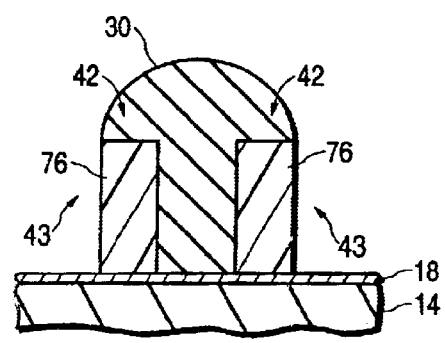
Figure 12:
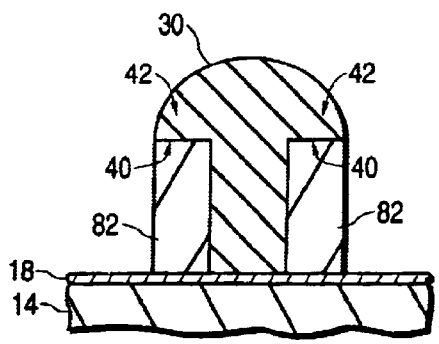

An alternative method of the present invention is depicted in FIGS. 11, 12 and 13 as are next described. The alternative method starts with a photolithographically mushroom plated component as depicted in FIG. 6 and described hereabove. Thereafter, as depicted in FIG. 11, a dry etch process, such as RIE utilizing oxygen as the reactive species 80, is conducted. Following the RIE process step, as depicted in FIG. 12 portions of the photoresist have been removed, whereas, owing to the directional nature of the RIE process, the portion 82 of the photoresist layer 22 beneath the surface 40 of the mushroom overhang 42 remains. Thereafter, as depicted in FIG. 13, the device is heated to form hard baked photoresist 84 beneath the mushroom overhang 42. As discussed hereabove, for certain devices which require an annealing step, the annealing step also serves as the step to hard bake the photoresist 22. Thus, as depicted in FIG. 3, the hard bake photoresist 84 entirely fills the area 43 beneath the mushroom overhang.

Figure 14:
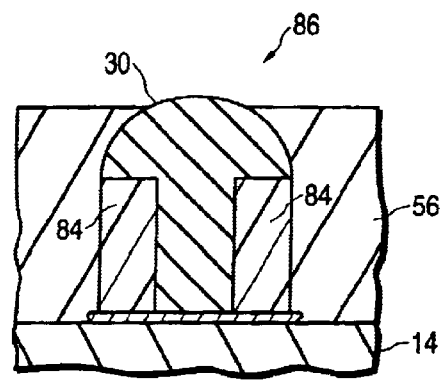

It is to be noted that the device as now constituted in FIG. 13 is substantially identical to the device as constituted in FIG. 9 described hereabove. Thereafter, the device depicted in FIG. 13 undergoes further process steps including the removal of outer portions of the seed layer and encapsulation 56, as depicted in FIG. 14 which is similar to FIG. 10 described hereabove, to form a completed device. It can therefore now be understood that the significant difference between the process of the first embodiment depicted in FIGS. 6–10 and the process of the alternative embodiment depicted in FIGS. 11–13 is the reversal of the hard bake and RIE steps. Specifically, in the first process steps embodiment the resist layer 22 is hard baked, followed by the RIE step. In the alternative process steps embodiment the RIE step is performed first and then followed by the hard bake step. While there may be subtle differences in the resulting devices, the significant advantages of the two processes are identical; those being the elimination of the redeposition problem and the void problem that are found in the prior art mushroom plating manufacturing processes.

A specific application of the present invention in the plating of the yoke component of a write head pole portion of a thin film magnetic head is next described with the aid of FIGS. 15–22. Initially, as will be understood by those skilled in the art, FIG. 15 is a side cross-sectional view of portions of a thin film magnetic write head 100 during its manufacturing process. As depicted in FIG. 15, a P1 magnetic pole 114 has been deposited, followed by a gap layer 116, insulating layers 122 and inductive coil members 124, and a further top insulating layer 126. Thereafter, a seed layer 128 has been deposited to facilitate the electroplating of the yoke layer. Thereafter, as depicted in FIG. 16, a photolithographic resist layer 134 is deposited upon the seed layer 128; it corresponds to resist layer 22 of FIGS. 2 and 6. Typically, the resist layer 134 is deposited in a spin deposition process which tends to be planarized and which therefore results in a relatively thick resist layer portion 138 at the pole tip area 140, and a relatively thin resist layer portion 142 on top of the area 144 above the inductive coils area 124. Thereafter, utilizing photolithographic techniques the yoke shaped trench 146 is formed within the resist layer. It is significant to note at this point that the walls of the yoke trench 146 are thickest 152 (meaning the trench is deepest) at the P2 pole tip area 140, and the trench walls are thinnest 156 in the area 144 on top of the coils 124. In a typical application the thick walled portion 152 may be approximately 4 microns while the thinner portion 156 may be approximately 2 microns.

As depicted in FIGS. 17 and 18 the next step in the manufacturing process is to electrochemically plate up the yoke 160 into the yoke trench 146, and mushroom plating occurs during this process. Specifically, the plating process is conducted to plate up the yoke 160 in the P2 pole tip area 140 to fill the yoke trench 146 to almost its full depth. However, as noted above, the yoke trench walls 156 at the coil area 144 are not as high as the walls 152 at the P2 pole tip area 140. Thus, mushroom plating of the yoke 160 occurs in the coil area 144 of the device to produce the mushroom head overhangs 164 depicted in FIG. 18, whereas no mushroom plating occurs in the deeper trench 152 at the pole tip area 140.

Following the plating up of the yoke, an improved thin film head is created utilizing the process steps of the present invention. Specifically, rather than removing the photoresist layer 134 utilizing a prior art wet chemical etch process, which will result in the unwanted open area under the overhang 164 as occurs in of the prior art (see FIG. 4) and its resulting redeposition and void problems, the process of the present invention is employed. When utilizing the first embodiment of the present invention, as depicted in FIGS. 6–10 and described hereinabove, the device 100 is next annealed (see FIG. 19), which results creating a hard baked photoresist 168. As is next depicted in FIG. 20 this step is followed by a reactive etch process such as an RIE step using reactive species 172 to remove the hard baked photoresist 168 in all areas except the area 178 under the mushroom overhang 164, as depicted in FIG. 21. The device can then ultimately be encapsulated 182 as shown in FIG. 22 without the problems of redeposition and voids under the mushroom overhang. When utilizing the alternative process of the present invention, as depicted in FIGS. 11–14 and described hereinabove, after plating up the yoke 160, the RIE step using reactive species 172 is first performed, followed by the annealing step which hard bakes the remaining photoresist 178 under the mushroom overhang 164. Thereafter, the device is ultimately encapsulated 182 and the redeposition and void problems of the prior art mushroomed overhang are likewise eliminated.

A simplified top plan view of a disk drive that includes a thin film magnetic head of the present invention is depicted in FIG. 23. The disk drive 186 includes one or more hard disks 190 and one or more actuator arms 194 that have a slider device 198 mounted thereto. A magnetic head 100 of the present invention is formed on a surface of the slider member utilizing the manufacturing techniques described hereabove. As is well known to those skilled in the art, the disk drive 186 includes additional electromechanical and computerized components (not shown).

While the present invention has been shown and described with regard to certain preferred embodiments, it is understood that those skilled in the art will no doubt devise various alterations and modifications thereto which nevertheless include the true spirit and scope of the invention. It is therefore intended by the inventors that the following claims cover all such alterations and modifications that nevertheless include the true spirit and scope of the present invention.

What is claimed is:

1. A method for overplating metallic components in the manufacturing of thin film devices, comprising:
   depositing a resist layer;
   forming an opening in said resist layer for the plating of a component therein;
   overplating said component into said opening, such that a mushroomed head is formed with overhang portions disposed above portions of said resist layer;
   heating said resist layer to form a hard baked resist; and
   removing portions of said hard baked resist using a dry etch process, such that portions of said hard baked resist remain under said overhang portions of said mushroomed head.

2. A method as described in claim 1 wherein said dry etch process is a reactive etch process.

3. A method as described in claim 2 wherein said reactive etch process is selected from the group consisting of RIE, RIBE and CAIBE.

4. A method as described in claim 2 wherein said reactive etch process utilizes oxygen reactive species.

5. A method as described in claim 1 wherein said thin film device is a thin film magnetic head.

6. A method as described in claim 5 wherein said metallic component is a yoke portion of a magnetic pole.

7. A method as described in claim 6 wherein said heating step includes a magnetic pole annealing step.

8. A method as described in claim 1 wherein said component is an electrical interconnecting stud.

9. A method as described in claim 1 wherein an encapsulation step is performed following said dry etch process step.

10. A method for overplating metallic components in the manufacturing of thin film devices, comprising:
    depositing a resist layer;
    forming an opening in said resist layer for the plating of a component therein;
    overplating said component into said opening, such that a mushroomed head is formed with overhang portions disposed above portions of said resist layer;
    removing portions of said resist layer using a dry etch process, such that portions of said resist layer remain under said overhang portions of said mushroomed head; and
    heating said resist layer to form a hard baked resist.

11. A method as described in claim 10 wherein said dry etch process is a reactive etch process.

12. A method as described in claim 10 wherein said reactive etch process is selected from the group consisting of RIE, RIBE and CAIBE.

13. A method as described in claim 11 wherein said reactive etch process utilizes oxygen reactive species.

14. A method as described in claim 10 wherein said thin film device is a thin film magnetic head.

15. A method as described in claim 14 wherein said metallic component is a yoke portion of a magnetic pole.

16. A method as described in claim 15 wherein said heating step includes a magnetic pole annealing step.

17. A method as described in claim 10 wherein said component is an electrical interconnecting stud.

18. A method as described in claim 10 wherein an encapsulation step is performed following said dry etch process step.

* * * * *